(12) United States Patent
Ramakrishnan et al.

(10) Patent No.: US 6,274,841 B1
(45) Date of Patent: Aug. 14, 2001

(54) CONTROLLED PLASMA ARC CUTTING

(75) Inventors: Subramania Ramakrishnan, Victoria; Ashley Grant Doolette, Queensland; Maciej Wlodzimierz Rogozinski, Victoria; Frederick Bedrich Polivka, Victoria; Trevor Neil Kearney, Victoria; Maya Gershenzon, Victoria, all of (AU)

(73) Assignee: Commonwealth Scientific and Industrial Research Organisation (AU)

( * ) Notice: Subject to any disclaimer, the term of this patent is extended or adjusted under 35 U.S.C. 154(b) by 0 days.

(21) Appl. No.: 09/508,210

(22) PCT Filed: Sep. 8, 1998

(86) PCT No.: PCT/AU98/00727

§ 371 Date: May 17, 2000

§ 102(e) Date: May 17, 2000

(87) PCT Pub. No.: WO99/12692

PCT Pub. Date: Mar. 18, 1999

(30) Foreign Application Priority Data

Sep. 8, 1997 (AU) .................................................. P09014

(51) Int. Cl.⁷ .................................................. B23K 10/00
(52) U.S. Cl. .............................. 219/121.44; 219/121.39; 219/121.54; 219/121.57; 219/121.55
(58) Field of Search ........................ 219/121.54, 121.57, 219/121.56, 121.48, 121.39, 121.44, 130.1, 130.31, 130.32, 130.33

(56) References Cited

U.S. PATENT DOCUMENTS

| 4,983,807 | 1/1991 | Yamada . | |
|---|---|---|---|
| 5,464,958 | * 11/1995 | Flowers et al. | 219/121.54 |
| 5,521,350 | 5/1996 | Nishi . | |
| 5,614,110 | 3/1997 | Shintani . | |
| 5,866,871 | * 2/1999 | Birx | 219/121.48 |
| 6,124,564 | * 9/2000 | Sur et al. | 219/121.47 |

FOREIGN PATENT DOCUMENTS

| 0533387 | 3/1993 | (EP) . |
|---|---|---|
| 61-262464 | 11/1986 | (JP) . |
| 1210169 | 8/1989 | (JP) . |
| 10029068 | 2/1998 | (JP) . |
| 10029269 | 2/1998 | (JP) . |
| 1683927 | 10/1991 | (SU) . |

* cited by examiner

Primary Examiner—Mark Paschall
(74) Attorney, Agent, or Firm—Ladas & Parry

(57) ABSTRACT

A process and apparatus for cutting a material using a plasma arc jet provides improved uniformity along the length of cut, despite variations in cutting speed. This is achieved by pulsing the arc current and dynamically varying the pulsing. By this means the momentum of the plasma arc jet can be maintained substantially constant whilst the amount of energy delivered by the plasma arc jet is controllably varied. The pulsing can be dynamically varied in dependence on one or more of the cutting speed, the angle of ejection of a stream of molten material from the cut, the size of the droplets of the ejected material, the intensity of spectral pattern of light emitted from the plasma arc jet and material interface, and the arc voltage. The pulses can be varied by varying one or more of the pulsing frequency, the pulse duty, upper value of the pulse current, and depth of the pulses.

17 Claims, 13 Drawing Sheets

CONTROLLED PLASMA ARC CUTTING

TECHNICAL FIELD

This invention relates to a plasma arc cutting process and apparatus. In particular, the invention is concerned with controlling the electric arc in plasma arc cutting applications, such as in the metal fabrication industry.

BACKGROUND

In plasma arc cutting technology, the quality of a cut can be described in terms of the dimensional accuracy of the cut parts, cut angle (degree of squareness of the cut face in the direction normal to the cut), the amount of dross on the bottom of the workpiece (which will usually be metal plate), amount of spatter on the top of the workpiece and sharpness of the top and bottom edges of the cut part. Cut quality is determined, in particular, by the effectiveness of metal melting and removal from the workpiece, which depends on factors including the thermal energy delivered to the workpiece and on the momentum of the plasma jet.

The thermal energy delivered to the workpiece depends on the electrical energy of the plasma arc and on the efficiency of energy transfer to the workpiece. If it is assumed that the energy transfer efficiency is substantially constant, then the electrical energy of the plasma arc can be taken as a measure of the thermal energy delivered to the workpiece, which is the approach adopted in the following description.

The amount of electrical energy per unit length of cut is a significant process variable affecting the material melting process. This process variable is determined by the cutting speed, arc voltage, arc current and pressure of the plasma forming gas. Conventional process control for plasma arc cutting relies on regulation of the cutting speed, arc voltage, arc current and plasma gas pressure around constant (optimal) set points which are chosen to ensure the best cut quality for a given plate. In general, the optimal cutting speed cannot be maintained at all times, for example, for a plasma arc cutting operation that is integrated with a manufacturing process such as welding, as in continuous pipe making, the optimal welding speed may determine the use of a non-optimal cutting speed. Also the optimal cutting speed cannot be maintained during the cutting of complex parts using profiling machines because of the finite acceleration capabilities of these machines. That is, the deceleration along the x-axis and acceleration along the y-axis of such a machine during the traversal of a 90° corner results in a decrease of the cutting speed near the corner.

The effect of variations in the cutting speed on the amount of energy per unit length of a cut is twofold. First, the amount of energy per unit length of cut increase with decreasing cutting speed for constant arc voltage, arc current and pressure in the nozzle chamber. Second, the arc voltage increases with decreasing cutting speed thus further contributing to the increase in the amount of energy per unit length of cut. Such an increase in the arc voltage is due to an effective increase in the length of the arc caused by the movement of the arc anode root down the cutting front at reduced cutting speed.

The increase in the amount of energy per unit length of cut when the cutting speed reduces results in an excessive amount of molten metal which cannot be completely removed by the momentum of the plasma jet. Further, at low cutting speeds the shape of the cut front changes resulting in a change in the direction of ejection of molten metal. This leads to dross formation and possibly to corner undercut. Dross is often formed well beyond the deceleration-acceleration region of a corner which is due to the shape of the cut front. Since the cut front depends upon the diffusion of heat through the plate, there is a time dependent mechanism associated with dross formation initiated in the vicinity of the profile corner. This means that a significant part of the profile may be affected by dross formed at the bottom of the plate.

In the prior art the amount of energy per unit length of cut has been controlled by varying the torch-to-workpiece distance. However the amount of variation in this distance that is available and its effect on the amount of energy is generally insufficient to eliminate dross formation in the vicinity of profile corners. The amount of energy per unit length of cut may also be controlled by varying the arc current in response to changes in the cutting speed, for example, by decreasing the arc current while decreasing cutting speed. This type of control of the amount of energy per unit length of cut may ensure effective metal melting, however the cut quality also depends on the effectiveness of metal removal from the workpiece, which in turn depends on the momentum of the plasma jet.

It can be shown that the momentum of a plasma arc jet emanating from the nozzle of a plasma arc cutting torch is approximately proportional to the gas pressure in the nozzle chamber and that there is a strong relationship between this pressure and arc current. Thus the pressure in the nozzle chamber, and therefore the plasma jet momentum, varies with current. The effect of this is that although the energy per unit length of cut could be controlled effectively by varying the arc current, this is at the expense of the plasma jet momentum. That is, a decrease in arc current results in a decrease in the momentum of the plasma jet and this reduces the effectiveness of metal removal by the plasma jet. Thus effective metal removal and therefore a high quality of cut around a profile cannot be maintained.

Japanese Patent No. 1884596 (Kokai 61-262464) by S Hagihara et al, discloses pulsing of the arc current to reduce the amount of dross and to enable high speed cutting. Soviet patent document SU-1632670-A, also discloses pulsing of the arc current to increase the cutting speed. However in both of these disclosures the arc pulsing parameters are fixed during cutting. Japanese Kokoku 44-29967 also discloses pulsing of the arc current, but with a cyclic variation in the amplitude of the pulses to uniformly distribute the heat of the plasma arc down the depth of the cutting groove to reduce narrowing and irregularities in this groove.

Although the above disclosures for pulsing the arc current give improved cut quality, the uniformity over the length of a cut, particularly when producing parts having a complex profile, is variable. Also in the above Japanese and Soviet patent documents, the current pulsing is "upwards" in the sense that the torch is operated at or near its DC rating and current pulses of increasing amplitude are imposed on this DC current such that generally the current rating of the nozzle is momentarily (i.e. for the duration of each pulse or over a lesser period) and repeatedly exceeded. This can lead to problems such as double arcing and thus a shortened lifetime for the torch consumables.

DISCLOSURE OF THE INVENTION

An object of the present invention is to provide a plasma arc cutting process and apparatus giving improved uniformity along the length of a cut.

According to the invention there is provided a process of cutting a material using a plasma arc jet, wherein a current supplied to a torch for generating the plasma arc is pulsed and the pulses are varied during the cutting process, and wherein the pulse variations are such that the momentum of the plasma arc jet is maintained substantially constant while the electrical energy of the arc is varied.

The inventors have discovered that the electrical energy of the plasma arc (and thus the thermal energy delivered to the workpiece) can be varied to maintain it substantially at an optimum level throughout the length of a cut whilst maintaining the momentum of the arc jet at a level that ensures effective removal of the material, that is, the inventors have effectively decoupled the jet momentum from the arc current such that their combined effect gives an improved result, namely cuts of enhanced uniformity. This is achieved by pulsing the arc current and varying the pulse parameters.

Preferably the arc current is pulsed "downwardly" in the sense that the upper current value for the pulses is typically the current rating of the nozzle. This feature is believed to contribute to an improved consistency of operation over prior art torches over a number of operations, that is, the cut quality and its repeatability are enhanced.

The pulse parameters that may be varied include the pulsing frequency, pulse duty, upper current value and depth of pulsing. "Pulse duty" as used herein means the ratio of the time during which the current is at its lower value (the arc current pulse duration) and of the sum of the time during which the current is at its lower and upper values (period of the arc current pulsing). The "depth of pulsing" is defined as:

Depth of pulsing=(upper current value−lower current value)/upper current value.

The momentum of the jet may be maintained substantially constant by controlling the pulsing frequency. As is described above, the momentum of the jet is approximately proportional to the pressure in the nozzle chamber, that is, the momentum is determined by the nozzle chamber pressure. Thus, if fluctuations in this pressure could be avoided whilst pulsing the arc current, the momentum of the jet ought to remain unaffected. The time constant of the pressure response to a step change in the arc current depends, in particular, on the volume of the nozzle chamber and is usually in the order of only a few milliseconds. Thus, if the period of the arc current pulsing is made sufficiently short, significant fluctuations of the pressure in the nozzle chamber can be avoided. The inventors have determined that the pressure fluctuations in the nozzle chamber are insignificant when the period of the arc current pulsing is of the order of the time constant of the pressure response to a step change in the arc current. A suitable range of the pulsing frequency is about 150 Hz to 600 Hz.

The invention also provides plasma arc cutting apparatus including, a plasma arc torch, a power supply for supplying a current to the torch for generating a plasma arc, and means for pulsing the current to the torch, wherein the pulsing means is operable to variably pulse the arc current such that the momentum of the plasma arc jet is maintained substantially constant whilst the electrical energy of the arc is varied.

Preferably in a process according to the invention, the electrical energy of the arc is controllably varied in dependence on a cutting process variable. Thus, apparatus according to the invention preferably also includes means for measuring a cutting process variable to supply a signal to the pulsing means to variably pulse the arc current in dependence on the cutting process variable. Preferably this variable is the cutting speed, however other variables that may be used include the angle of a stream of molten material ejected from the cut (kerf), the size of droplets of molten material ejected from a workpiece, the intensity or spectral pattern of light emitted from the plasma arc jet and material interface, or the arc voltage.

Controlling the arc current pulsing in an on-line manner depending on some cutting process variables allows a high and uniform cut quality to be obtained for a range of cutting speeds. Optimal control of the arc current pulsing involves on-line control of the pulsing frequency, pulse duty, upper current value and depth of pulsing. However the invention includes simplified control strategies involving on-line control of some of the parameters of the arc current pulsing while the remaining parameters are fixed. For example, the pulse duty, upper current value and depth of pulsing may be controlled on-line while the pulsing frequency is fixed. This allows simplification of the control apparatus.

The relationship between the speed of cutting and amount of energy per unit length of cut supplied by the arc, and how this can cause an excessive amount of molten material to be produced when the cutting speed slows, has been described above. Thus, according to the strategy of the present invention, as the cutting speed slows, the arc current pulses are varied in a dependent manner to maintain the momentum of the arc and to reduce the electrical energy of the arc and thus the amount of molten material. The other cutting process variables that are given above may be similarly used: thus an excessive lead (or lag) angle of the molten stream of material ejected from the kerf indicates that an excessive (or insufficient) amount of energy per unit length of cut is being delivered to the workpiece. Likewise, large droplets of molten material indicate the delivery of excessive amount of energy per unit length of cut.

For a better understanding of the invention and to show how it may be carried into effect, embodiments thereof will now be described, by way of non-limiting example only, with reference to the accompanying drawings.

DETAILED DESCRIPTION OF PREFERRED EMBODIMENTS

Figure 1:
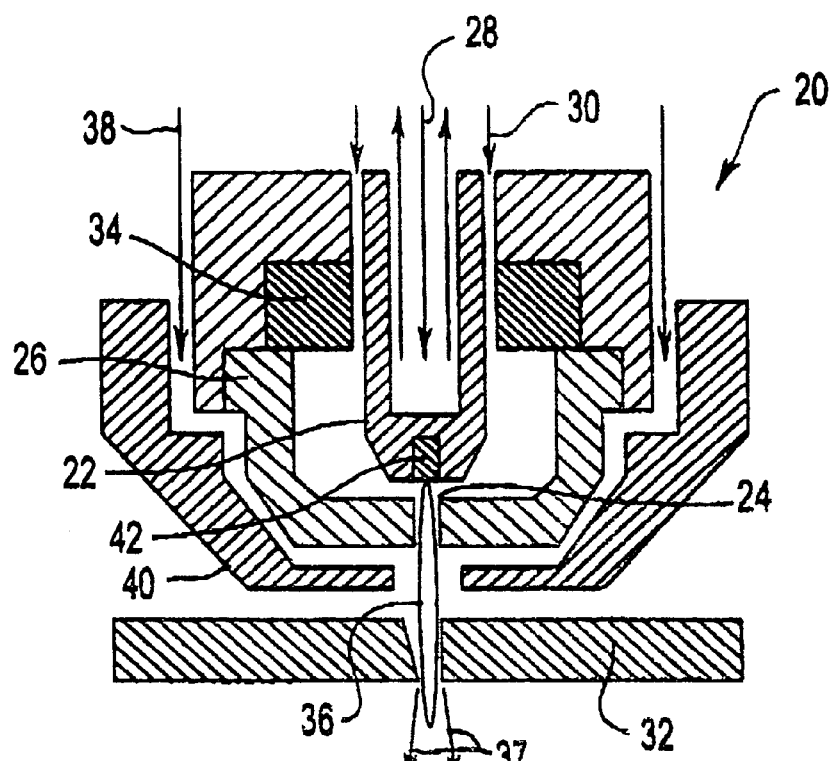
FIG. 1 schematically illustrates a plasma arc torch to which the invention is applicable.

A cross-section of a typical transferred arc, dual flow plasma arc torch 20 is shown in FIG. 1. The torch comprises a body (not shown) which includes an electrode 22 (typically the cathode) centred above a bore 24 in a constricting nozzle 26. Both the electrode 22 and nozzle 26 may be water cooled to reduce their erosion (for example, coolant flow for the electrode 22 is shown by arrows 28). A suitable plasma forming gas 30 (e.g. air, oxygen, nitrogen or a mixture of argon and hydrogen) flows under pressure around the electrode 22 and through the nozzle bore 24 towards a workpiece 32. The plasma forming gas 30 may pass through a swirl ring 34 that improves arc stability and squareness of the cut on the part side of the kerf. An arc 36 from the torch 20 is constricted by the flow of gas 30 through the nozzle 26, further constriction can be achieved by applying a shield gas 38, or by water as in a water injection torch or by a secondary nozzle as used in high precision cutting torches. The nozzle 26, a shield 40 and electrode 22 are usually made of copper. An electron emitting element 42 inserted in the tip of electrode 22 is made of hafnium, zirconium or tungsten depending on the plasma forming gas.

Molten material ejected from a workpiece 32 as it is cut by a plasma arc jet 36 is shown by reference 37.

Figure 2:
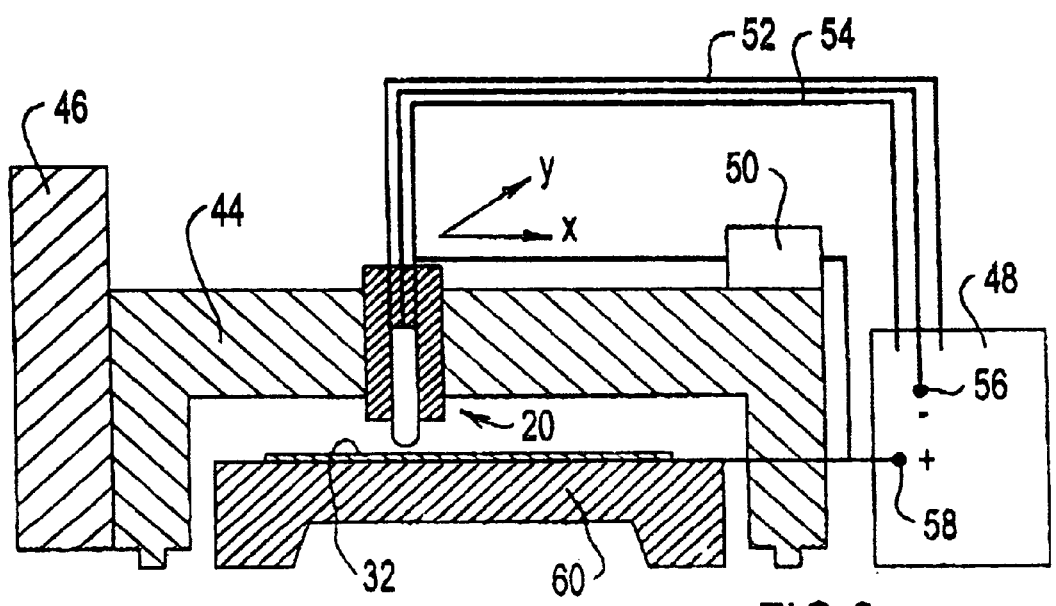
FIG. 2 schematically illustrates a profiling machine incorporating the torch of FIG. 1.

A diagram of a typical mechanised plasma arc cutting system with a planar profiling machine is shown in FIG. 2. This consists of a cutting torch 20 mounted on a carriage 44 movable along x and y axes under the control, for example, of a CNC controller 46. The system also includes a power supply 48, arc igniter 50 and requires plasma forming and shield gases 52 as well as torch coolant 54. In the case of a transferred arc torch 20, one terminal 56 of the power supply 48 (typically negative polarity) is connected to the electrode (cathode) 22 of the torch 20 and the other terminal 58 to the workpiece (anode) 32 which is mounted on a cutting table 60. The arc igniter 50, which is a high-frequency, high-voltage generator, is used to establish a pilot arc between the electrode 22 and nozzle 26 of torch 20. Subsequently, under the influence of a strong gas flow, the arc transfers to the workpiece 32.

The invention includes use of a plasma arc cutting torch 20 that can be hand-held, or mounted on a profiling machine (as in FIG. 2), on a 3-axis gantry or on an articulated robotic manipulator.

The results presented in this description were obtained using a Hypertherm MAX200 plasma arc cutting system. This system includes a 200 A chopper-based power supply. Either air or oxygen was used as the plasma forming gas. Air was used as the shield gas. The machine used to guide the torch above the workpiece was a Farley Cutting System Wizard II. This machine comprises gantry elements which translate in orthogonal directions.

Figure 3:
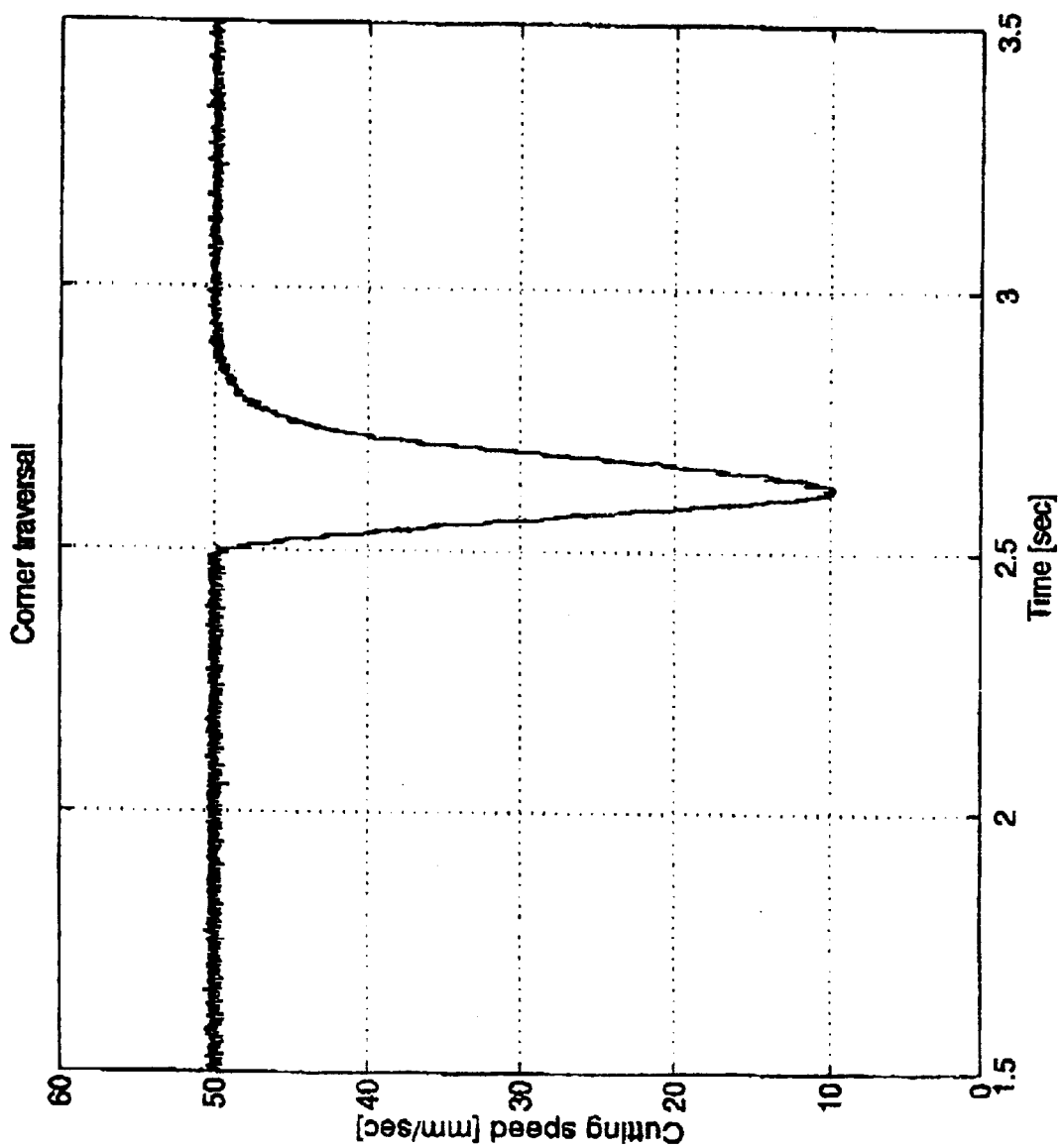
FIG. 3 shows how cutting speed varies during traversal of a corner using a machine as in FIG. 2.

An optimal cutting speed cannot be maintained during cutting of complex parts using a profiling machine as in FIG. 2 because of the finite acceleration capability of these machines, for example, the deceleration of the x-axis and acceleration of the y-axis during traversal of a 90° corner results in a decrease of the cutting speed near the corner, as shown in FIG. 3.

Figure 4:
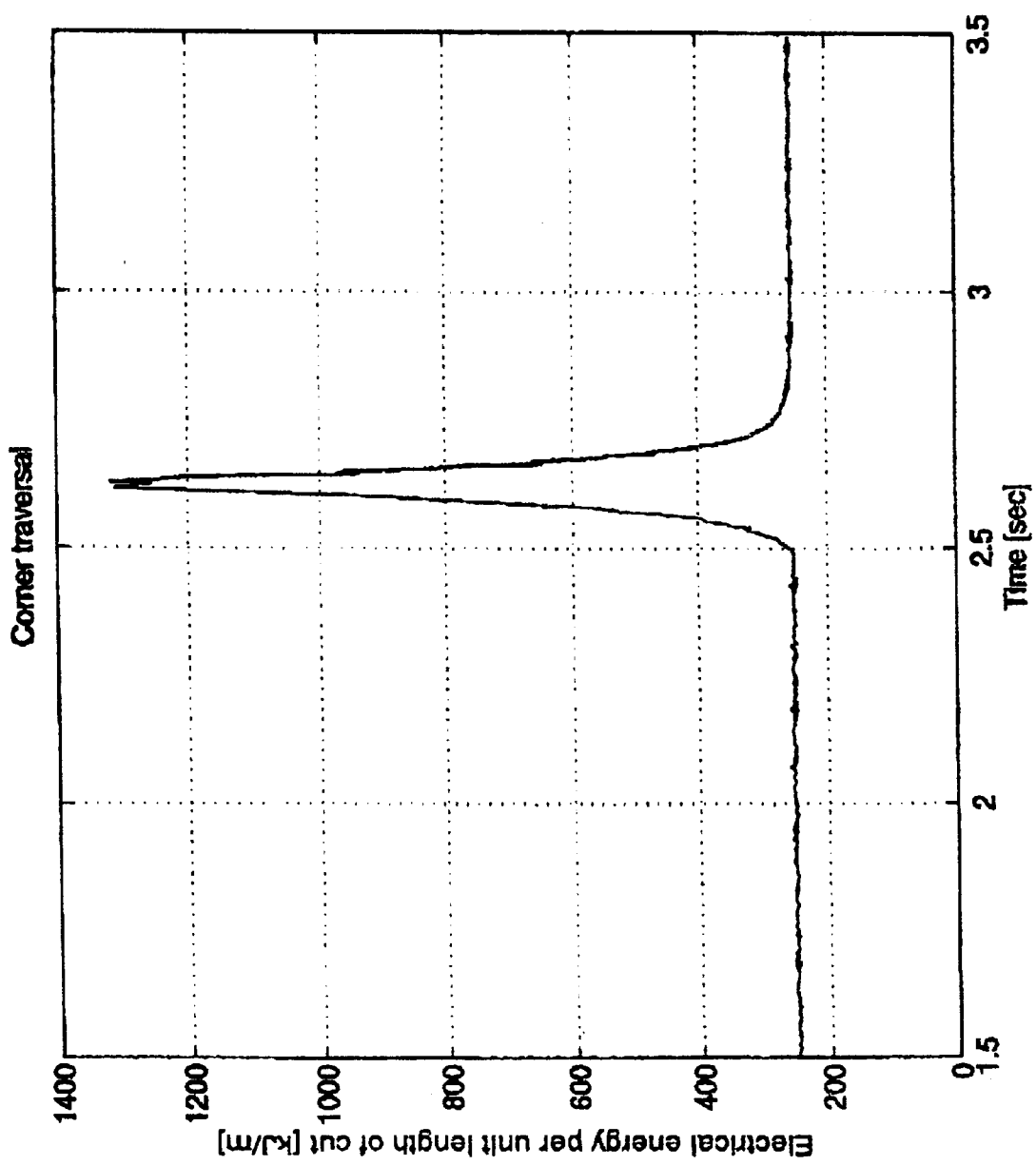
FIG. 4 shows the variation in electrical energy per unit length of cut as a result of the cutting speed variation shown in FIG. 3.

The overall effect of this change in cutting speed on the amount of energy per unit length of cut is illustrated in FIG. 4 depicting the variation of the electrical energy during the above-mentioned cutting of a corner (100 A current, 3 m/min optimal cutting speed). The increase of the energy near the corner of the profile results in excessive amount of molten metal which cannot by completely removed by the momentum of the plasma jet. This leads to dross formation and possibly to corner undercut. The dross is often formed well beyond the corner deceleration-acceleration region, that is, there is a memory effect associated with dross formation initiated in the vicinity of the profile corner. This means that a significant part of the profile may be affected by dross formed at the bottom of the plate.

The amount of energy per unit length of cut may be controller by varying the arc current in response to changes in the cutting speed, for example, by decreasing the arc current with decreasing cutting speed. This type of control of the amount of energy per unit length of cut may ensure effective metal melting. However, the cut quality depends also on the effectiveness of metal removal from the workpiece. This effectiveness of metal removal depends on the momentum of the plasma jet which is determined by the arc current.

The force exerted by the plasma jet on the molten material at the cut is a function of the momentum of the plasma jet which is proportional to the product of the mass density of the plasma and the square of its velocity. The nozzle of the plasma torch 20 has a straight bore and hence at the operating mass flow rates used for cutting, the velocity of the plasma at the nozzle exit 24 is sonic, as evidences by optical observations, which show a supersonic jet 36 emanating from the nozzle. Owing to the choking or sonic flow at the nozzle exit 24, the gas dynamic behaviour of the plasma described in terms of mass flow and jet momentum are primarily determined by the conditions in the nozzle chamber located upstream of the nozzle exit. Since the momentum of most gases used for plasma arc cutting is proportional to pressure over a wide range of temperature of 1000–30000 K, the momentum of the plasma jet 36 and the consequent force exerted by the jet on the molten material are approximately proportional to the pressure in the nozzle chamber.

The presence of a high-temperature, and hence low-density, arc plasma in the nozzle restricts the flow of gas through the nozzle. If the rate of mass flow through the nozzle exit is maintained approximately constant, the pressure in the nozzle chamber rises to overcome the restrictive effect of the plasma and maintain the mass flow rate.

Figure 5:
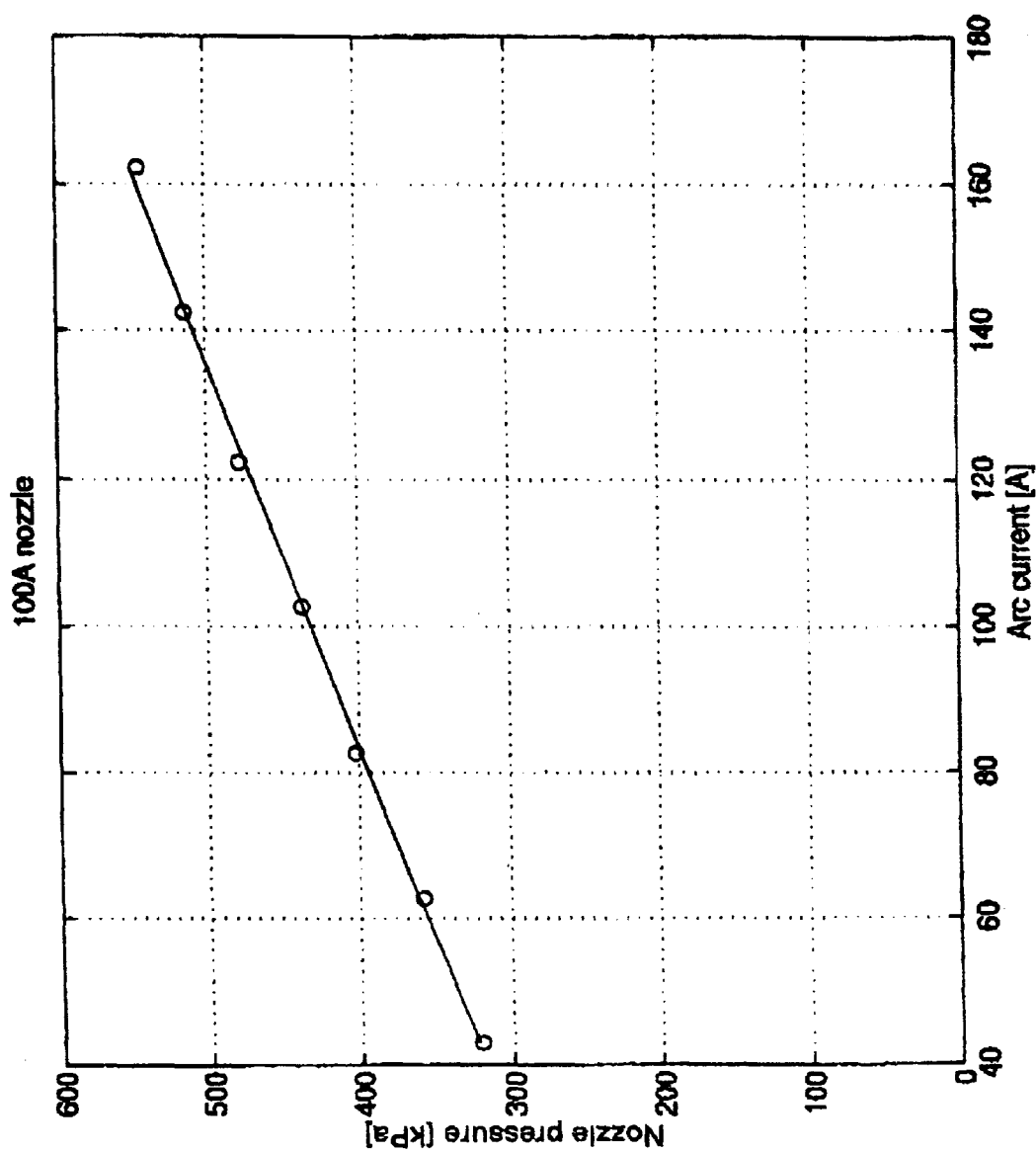
FIG. 5 shows the relationship between the pressure in the nozzle chamber and the arc current.

FIG. 5 (which is for a 100 A nozzle) shows that there is a strong relationship between the pressure in the nozzle chamber and arc current. Thus, the pressure in the nozzle chamber, and therefore the plasma jet momentum, varies with current and a strategy of controlling the amount of energy per unit length of cut by varying the arc current depending on the cutting speed would result in the momentum of the plasma jet decreasing during cutting of the profile corners. This means that effective metal removal and therefore high cut quality would not be maintained around the profile.

The process of the invention maintains the balance between the momentum of the plasma jet and the amount of energy per unit length of cut needed for high cut quality. The process relies on pulsing of the arc current down from an upper current value (typically the value of the current rating of the nozzle) for a short period of time in a repetitive manner at a sufficiently high frequency. This approach facilitates dynamic control of the amount of energy per unit length of cut without a significant decrease in the momentum of the plasma jet.

Figure 6:
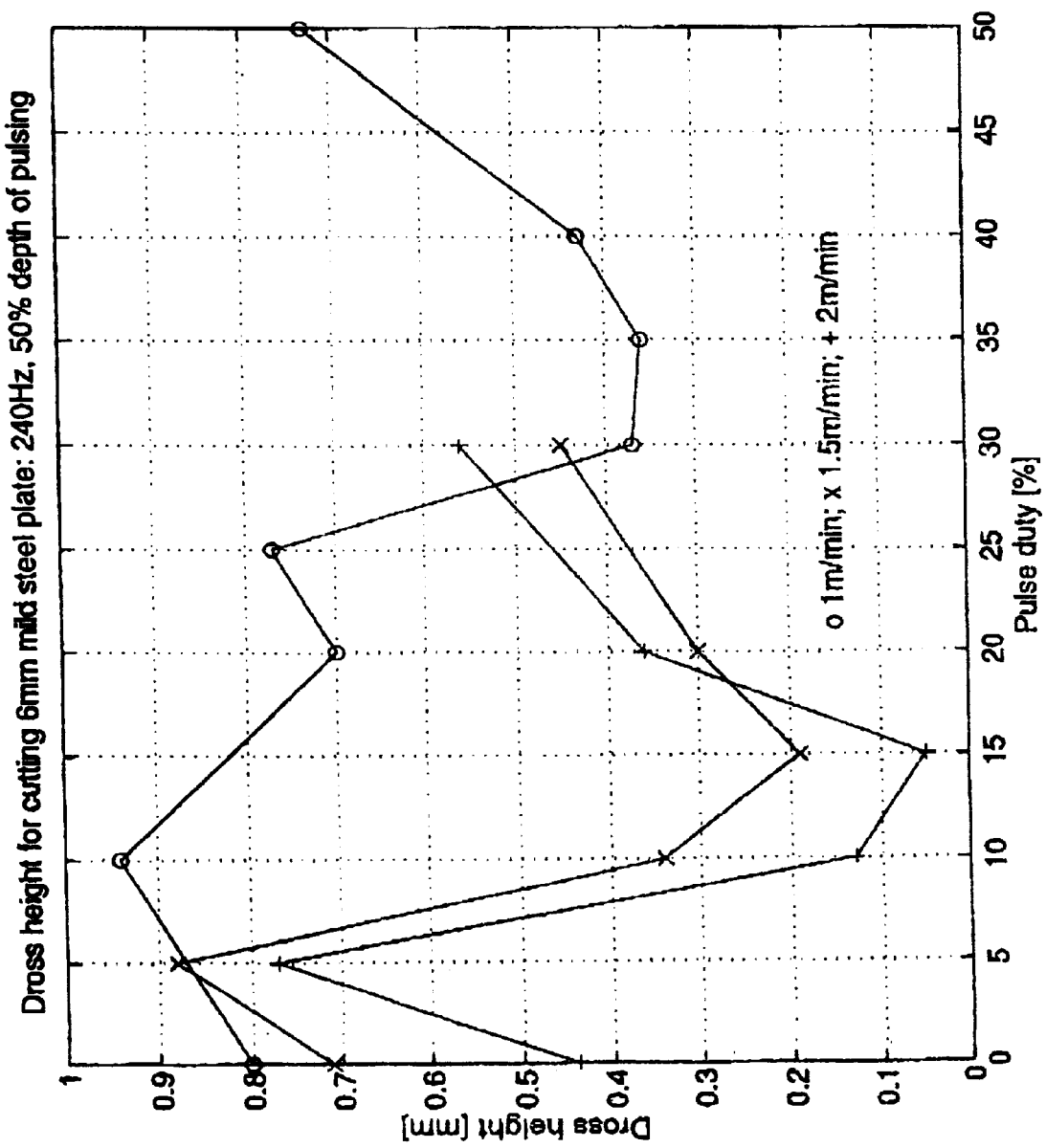
FIGS. 6 to 8 show the relationship between dross height and pulse duty for a range of cutting speeds.
Figure 7:
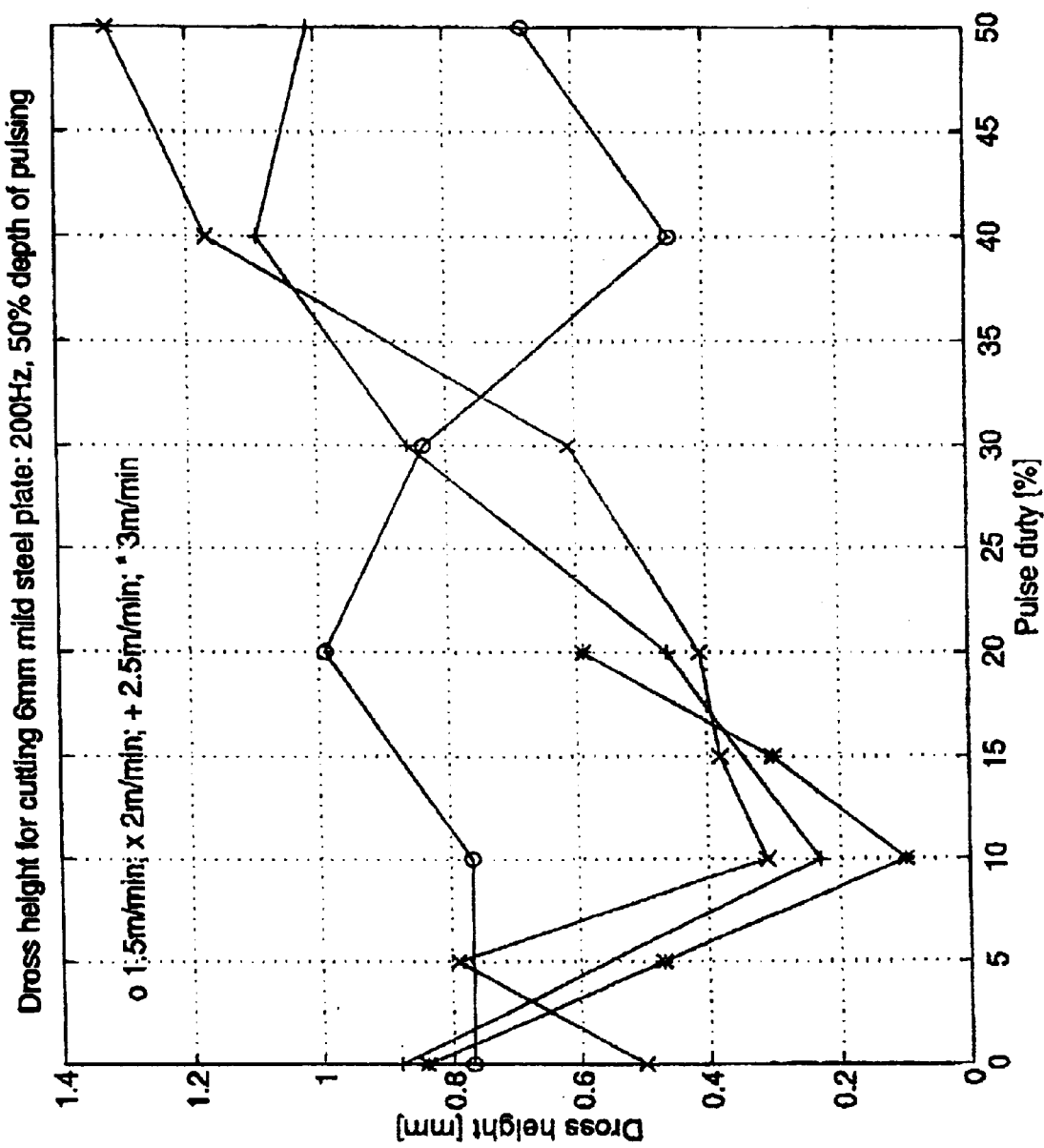
Figure 8:
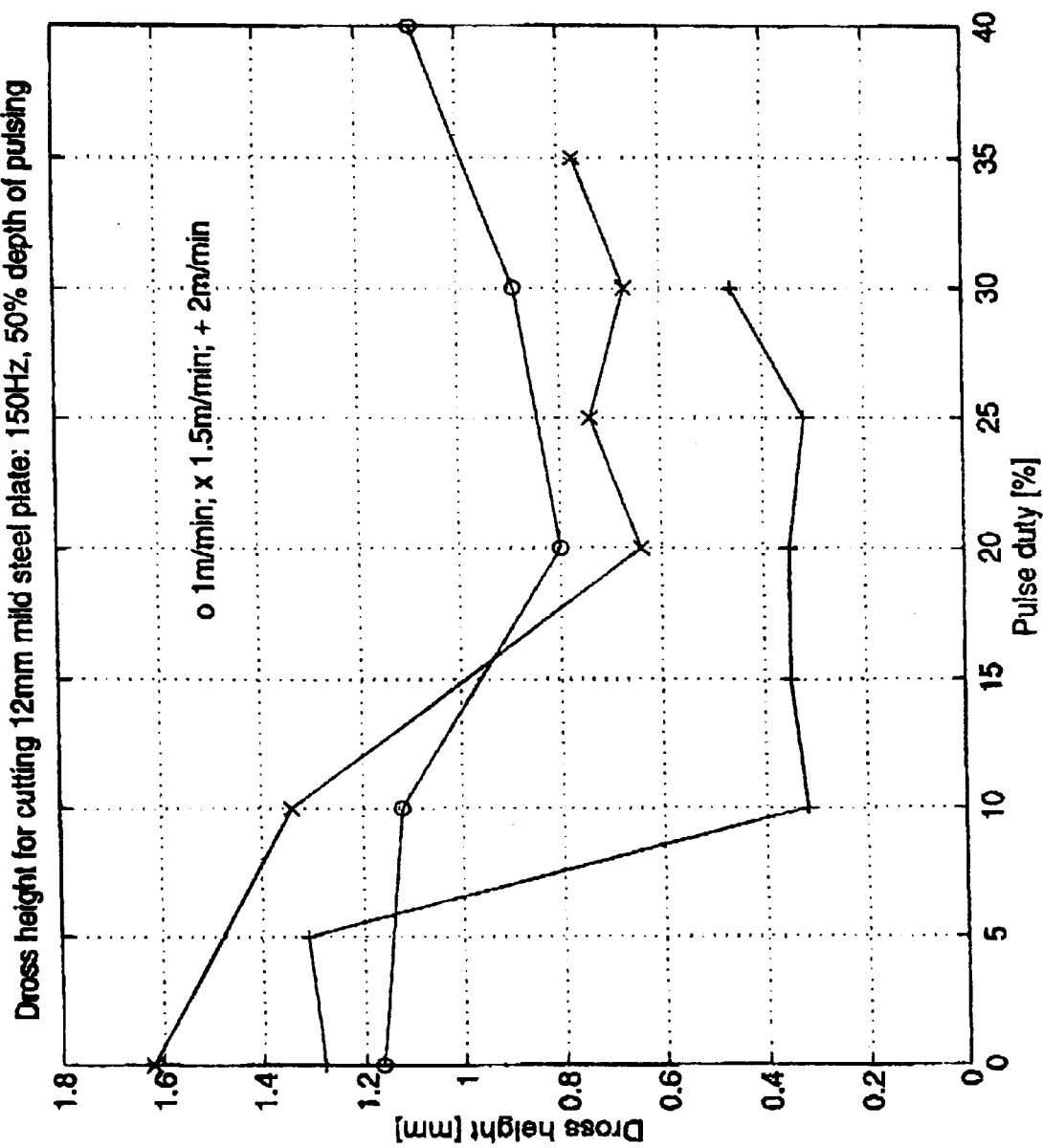

FIGS. 6 to 8 illustrate that a simplified control strategy according to the invention reduces the amount of dross. Thus FIGS. 6 to 8 show the dependency of the average dross height on the pulse duty and on the cutting speed for a fixed pulsing frequency, fixed upper current value and fixed (50%) depth of current pulsing. FIG. 6 is for 6 mm mild steel plate cut at 100 A upper current value, 50% depth of pulsing, 240 Hz pulsing frequency, 100 A nozzle. FIG. 7 is for 6 mm mild steel plate cut at 200 A upper current value, 50% depth of pulsing, 200 Hz pulsing frequency, 200 A nozzle. FIG. 8 is for 12 mm mild steel plate cut at 200 A upper current value, 50% depth of pulsing, 150 Hz pulsing frequency, 200 A nozzle. These Figs show that the optimal pulse duty increases with decreasing cutting speed. Hence, a reduction of the amount of dross can be obtained by using the following control law relating the pulse duty to the cutting speed for the fixed pulsing frequency, upper current value and depth of pulsing:

Pulse duty(t)=Nominal duty+Sensitivity×(Optimal cutting speed−Cutting speed(t))

Figure 9:
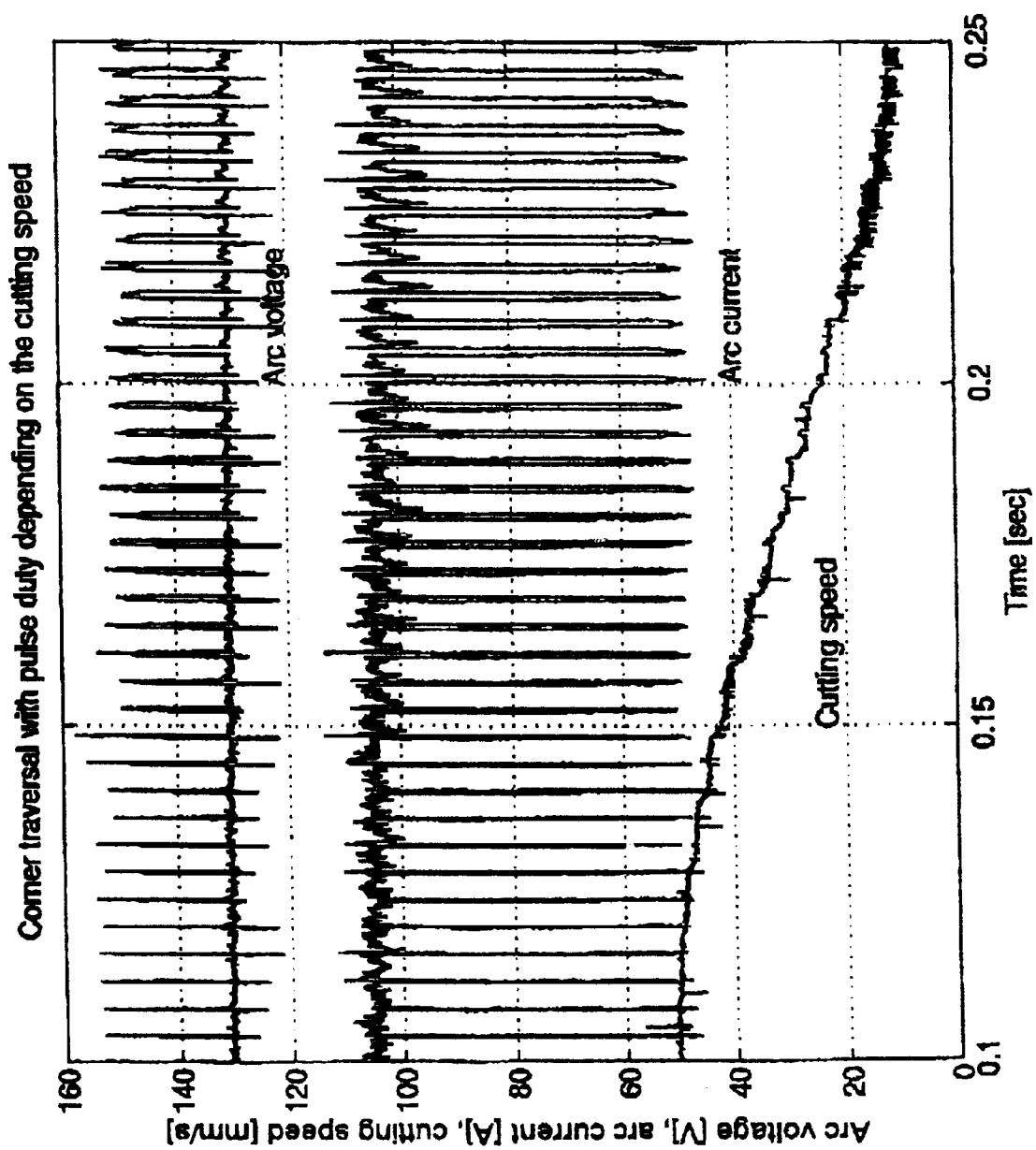
FIG. 9 shows the arc voltage, arc current and cutting speed during the traversal of a corner while cutting according to the process of the invention.
Figure 10:
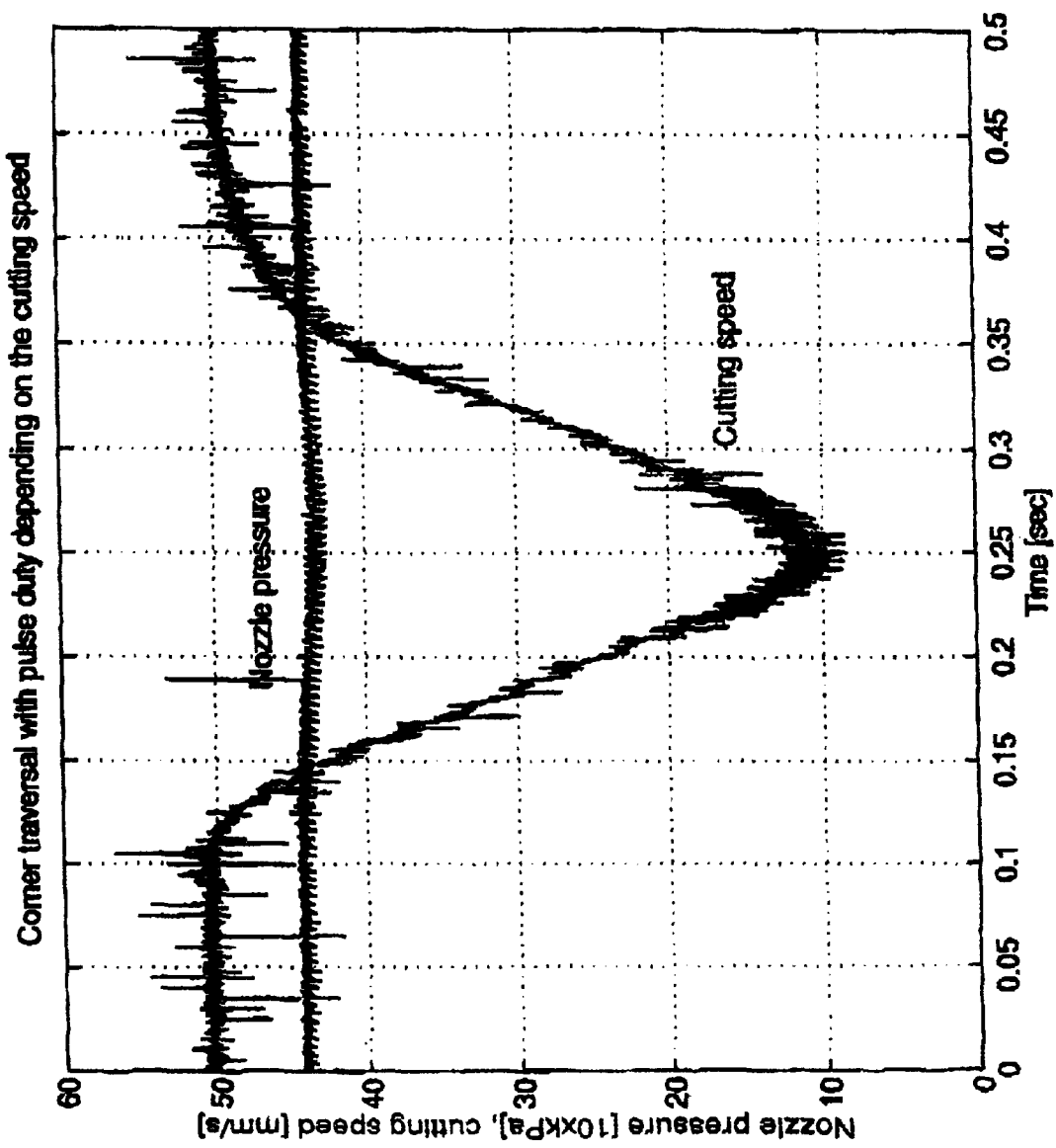
FIG. 10 shows the attainment of a substantially constant nozzle pressure (and hence plasma arc jet momentum) during the traversal of a corner while cutting according to the process of the invention).
Figure 11:
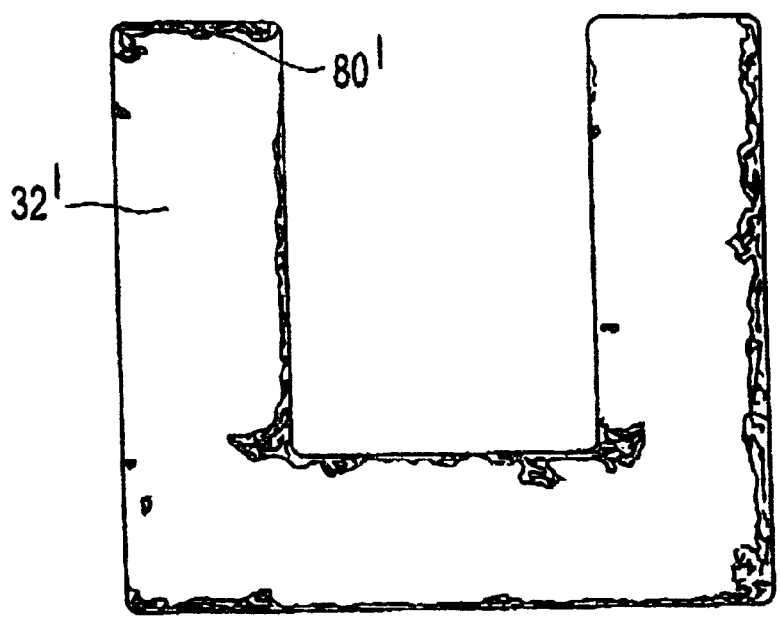
FIG. 11 shows a sample cut according to the prior art.
Figure 12:
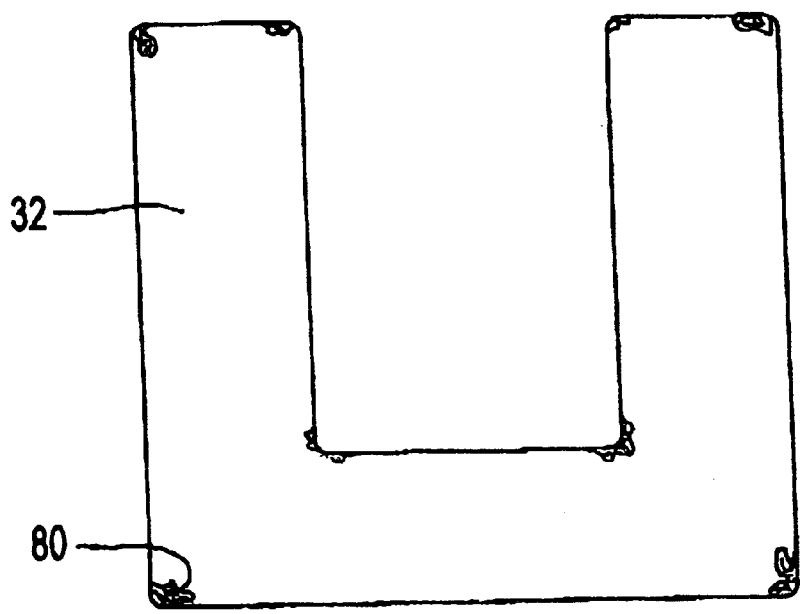
FIG. 12 shows a sample cut according to the process of the invention.

Nominal duty is the pulse duty at optimal cutting speed and can be set at 0% for conventional DC cutting (i.e. no pulsing). A small value of the Nominal duty of, say, 5% may be used as well since the arc current pulsing was found to have a desirable effect on cut quality even at optimal speeds. The Sensitivity is defined as the required change in the pulse duty per unit change of the cutting speed. The value of Sensitivity can be selected experimentally. The value of 8% per m/min was found to yield a significant dross reduction in the vicinity of profile corners for 6 mm and 12 mm mild steel plate cut at upper current value 100 A and 200 A for 100 A and 200 A nozzles, respectively. The arc voltage, current and cutting speed are shown in FIG. 9 during traversing a corner while cutting 6 mm mild steel plate at 100 A upper current value, 50% depth of pulsing, 240 Hz pulsing frequency, 5% nominal pulse duty, 3 m/min optimal cutting speed and 8% per m/min sensitivity. From the arc current waveform it can be seen there is an increase in the pulse duty with the decreasing cutting speed. The corresponding pressure in the nozzle chamber and the cutting speed are depicted in FIG. 10 (which shows the plasma forming gas pressure in the nozzle chamber and the cutting speed during traversing a corner while cutting 6 mm mild steel plate at 100 A upper current value, 50% depth of pulsing, 240 Hz pulsing frequency, 5% nominal pulse duty, 3 m/min optimal cutting speed and 8% per m/min sensitivity) from which it is evident that the nozzle pressure, and therefore the momentum of the jet, is almost constant. Samples of parts cut under DC conditions (no pulsing) and under pulsed conditions as in FIGS. 9 and 10 are shown in FIGS. 11 and 12 respectively. The sample workpiece 32 shown by FIG. 12 has very little dross 80 compared to the dross 80' on the sample workpiece 32' of FIG. 11.

The peak in the energy per unit length of cut occurring in the vicinity of the corner under DC conditions (c.f. FIG. 4) is decreased by 20% under the above pulsing conditions. Furthermore, the pressure in the nozzle chamber decreases only by 2% during corner traversal. If the Sensitivity were set to 30% per m/min, then the peak in the energy per unit length of cut would decrease by almost 40% whereas the pressure would decrease only by 6%. It is to be understood that this order of variation in the pressure is encompassed in the definition that the arc momentum is maintained "substantially constant". These results show that the energy per unit length of cut can be controlled by the arc current pulsing without affecting the nozzle pressure significantly. Thus, control of the energy per unit length of cut is effectively decoupled from control of the pressure in the nozzle chamber and therefore from the plasma jet momentum.

A more complex arc current pulsing algorithm may involve adjustment of the upper current value and of the depth of pulsing in response to changes in the cutting speed. For example, the upper current value may be controlled according to the following control law:

Upper current value(t)=Nominal upper current value−Sensitivity upper×(Optimal cutting speed−Cutting speed (t))

Furthermore, the depth of pulsing can be controlled indirectly by combining the above control law for the upper current value with the following control strategy for the lower current value:

Lower current value (t)=Nominal lower current value−Sensitivity lower×(optimal cutting speed−Cutting speed(t))

Figure 13:
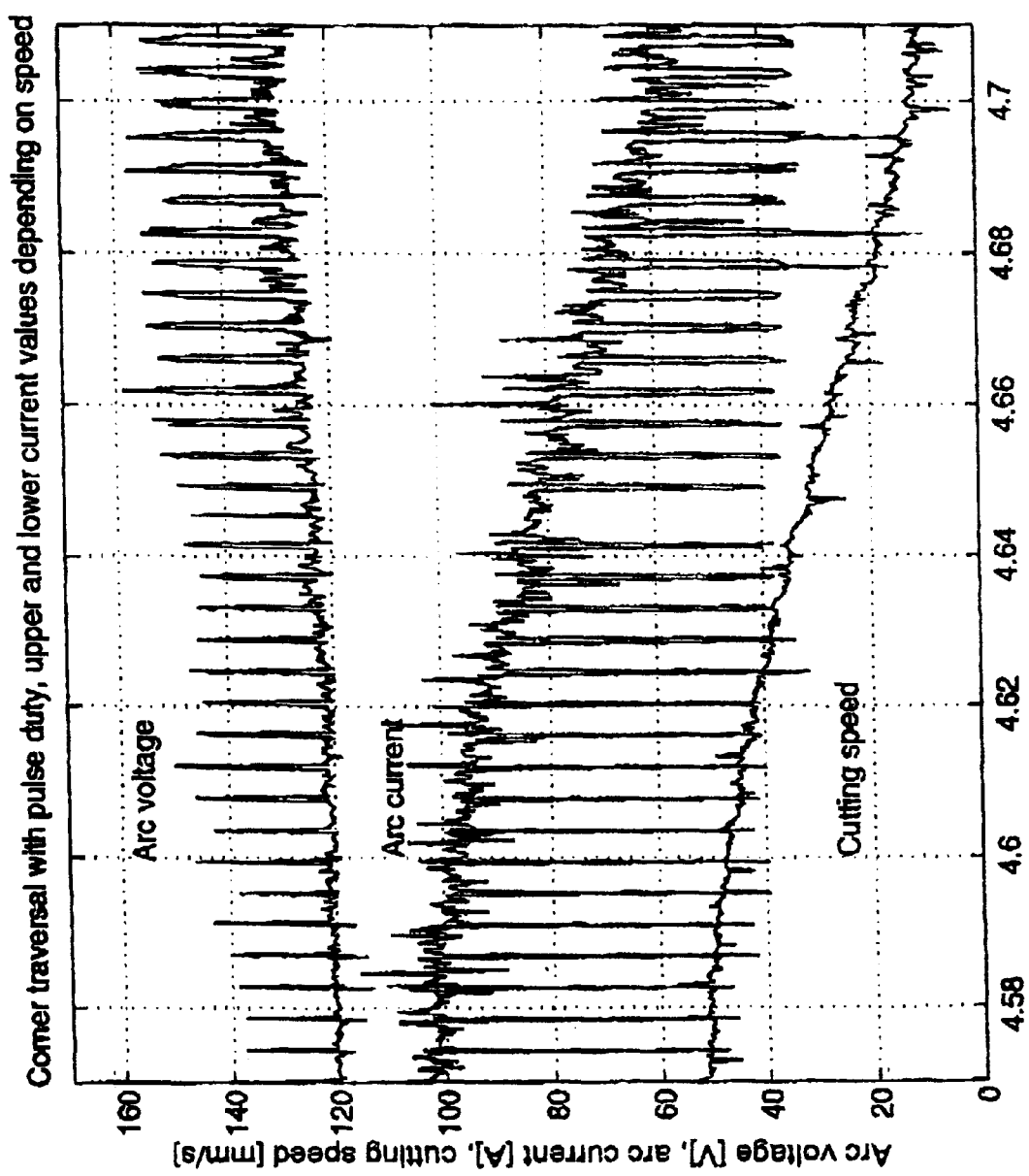
FIG. 13 shows the arc voltage, arc current and cutting speed during the traversal of a corner while cutting according to the process of the invention-using a different control strategy to that illustrated by FIG. 9.

The Sensitivity upper (Sensitivity lower) is defined as the required change in the upper (lower) current value per unit change of the cutting speed. Thus, the amount of energy per unit length of cut may be controlled by adjusting the pulse duty and the upper and lower current values. For example, the arc voltage, current and cutting speed are shown in FIG. 13 during traversing a corner while cutting 6 mm mild steel plate with 100 A nozzle and at 3 m/min optimal cutting speed and 240 Hz pulsing frequency with the following parameters: Sensitivity=8% m/min, Nominal pulse duty= 5%, Nominal upper current value=100 A, Sensitivity upper= 17 A per m/min, Nominal lower current value=60 A, Sensitivity lower=4 A per m/min.

Figure 14:
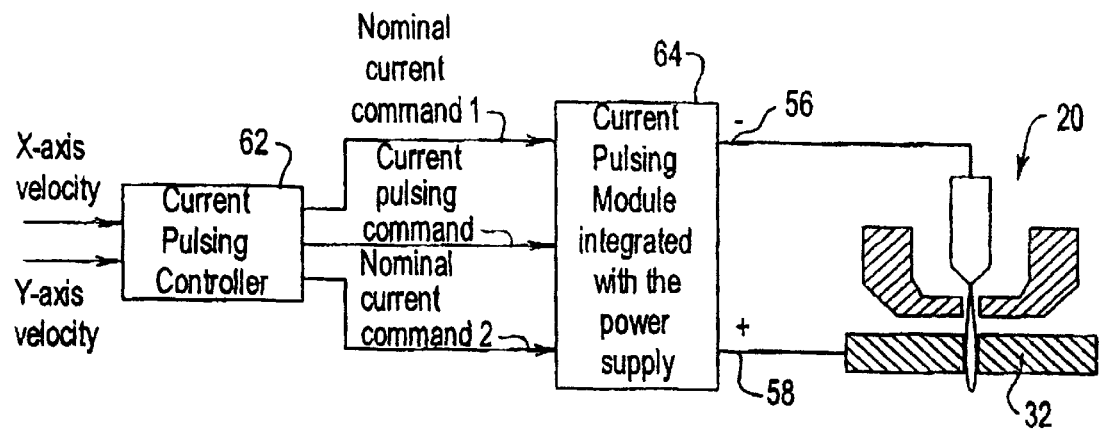
FIG. 14 is a functional diagram for apparatus according to the invention.

A functional diagram for apparatus according to the invention is shown in FIG. 14. The apparatus comprises a Current Pulsing Controller 62, a Current Pulsing Module integrated with a power supply 64 and a plasma arc cutting torch 20.

Figure 15:
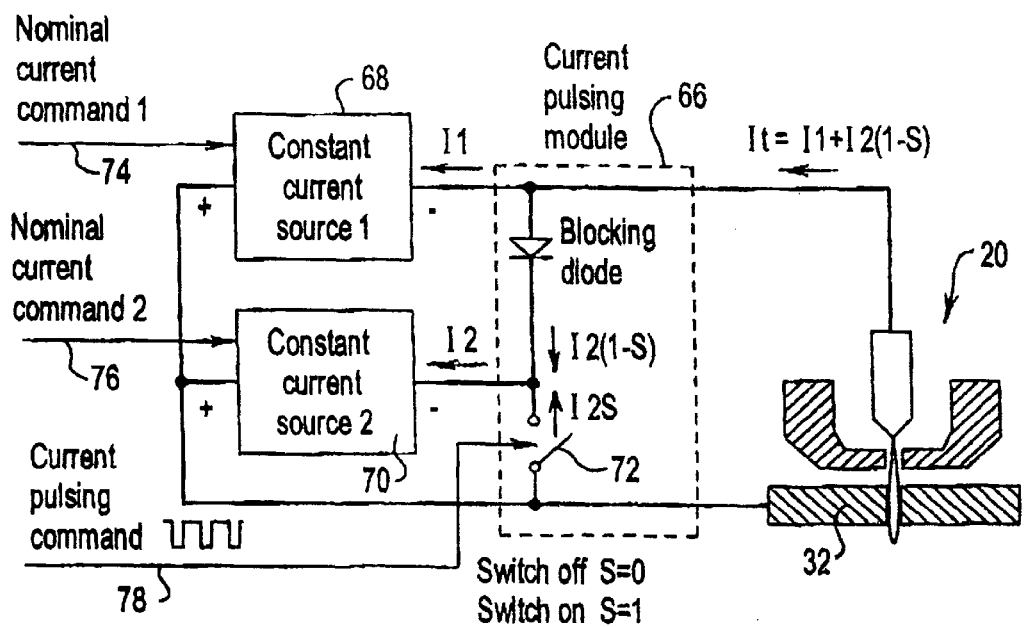
FIG. 15 is an electrical diagram for apparatus according to the invention.
Figure 16:
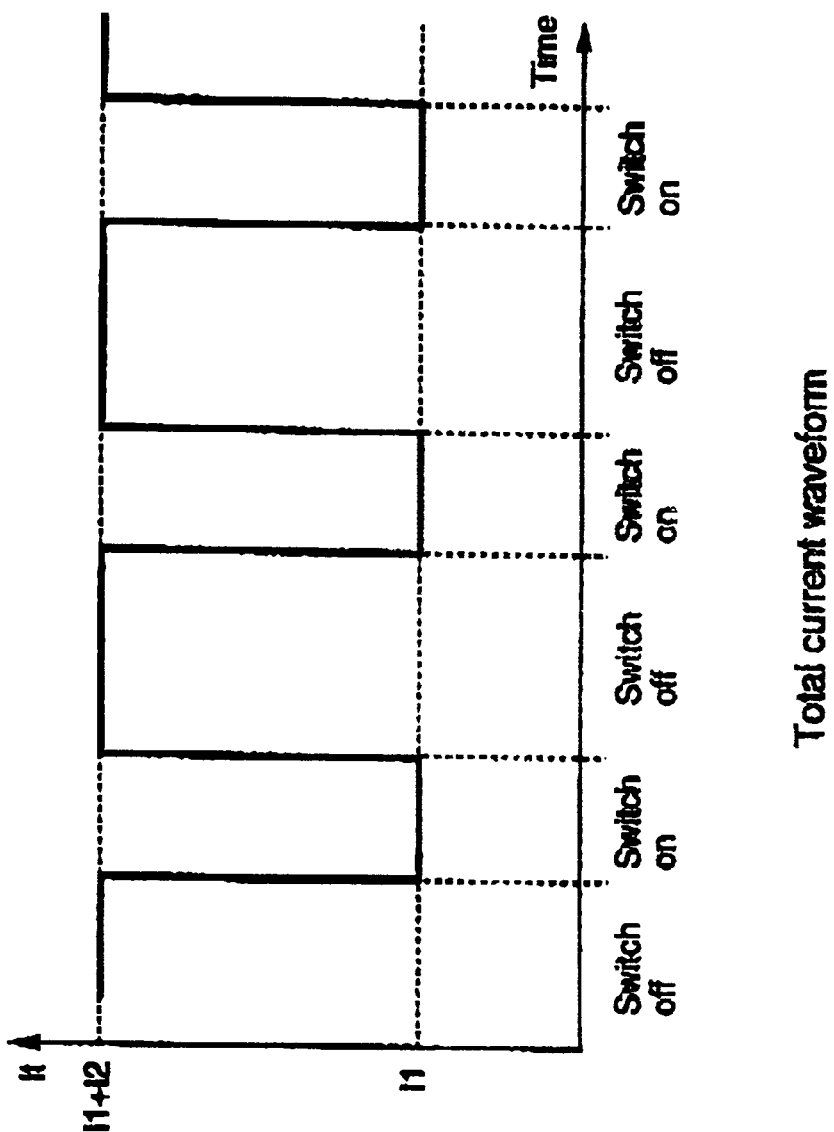
FIG. 16 is a graph for explaining the operation of FIG. 15.

A current Pulsing Module 66 (see FIG. 15) of the functional block 64 of FIG. 14 implements a non-dissipative current diversion technique to pulse the arc current. In this embodiment two chopper modules in the Hypertherm MAX200 power supply are used as two constant current sources 68, 70. The Current Pulsing Module 66 diverts current from one of the constant current sources 68 or 70 leaving only the other constant current source driving the plasma. The principle of the Current Pulsing Module 66 operation is depicted in FIG. 16. A high current, electronic switch 72 is used in the Current Pulsing Module 66.

The Current Pulsing Controller 62 (FIG. 14) synthesises a cutting speed signal, which may be derived from a tacho generator or encoder signals corresponding to each axis of the machine, corresponding to the velocity of the profiling machine motion axes. In general, the cutting speed signal is used to implement the control law which determines the arc current pulsing frequency, pulse duty, upper and lower current values. In this embodiment, the upper and lower current values are determined by the nominal current commands 74, 76 (see FIG. 15) (or set points for the two constant current sources). The nominal current commands determine the upper current value (I1+I2) and the lower current value I1, i.e., the depth of pulsing is given by I2/(I1+I2). The current pulsing command 78 is a square wave signal having required frequency and the pulse duty. The current pulsing command is generated by the Current Pulsing Controller 62 and drives the switch 72 in the Current Pulsing Module 66.

In other embodiments, instead of using a cutting speed signal, the angle of the stream of molten metal from the kerf, the size of droplets of ejected molten metal, or the intensity or spectral pattern of light emitted from the plasma arc jet and metal interface may be utilised. The angle of the stream of molten metal and the size of droplets of molten metal, or the intensity or spectral pattern of light emitted from the plasma arc jet and metal interface can be derived on-line from images of the cut region obtained by a suitable optical sensor or sensors located behind the cut plate or surface. The control algorithm may be implemented in an analog or digital form. The control parameters will depend on the type of material being cut and the thickness of the material.

A new process is described for dynamically controlling the plasma arc cutting process for the purpose of ensuring high cut quality for a wide range of cutting speeds. The process maintains a balance between the amount of energy per unit length of cut delivered to a workpiece to melt the metal and the optimal momentum of the plasma jet needed to remove the molten metal from the workpiece. The balance is maintained by pulsing the arc current in a controller manner. The parameters of the arc current pulsing are dynamically adjusted in response to some cutting process variables. In the examples described above, the pulse duty of the arc current pulsing is controlled on the basis of the cutting speed.

A process according to the invention facilitates:

1. Rapid control of the amount of energy per unit length of cut delivered to the workpiece and almost constant momentum of the plasma jet.
2. Enhanced atomisation of the molten metal in the cutting front and therefore more effective removal of the molten metal from the workpiece.
3. Improved, uniform and repeatable cut quality for a wide range of cutting speeds.
4. Improved, uniform and repeatable cut quality along the part profile, and in particular near sharp corners, because of the control of the power delivered to the workpiece linked to the control of the torch motion.

The invention described herein is susceptible to variations, modifications and/or additions other than those specifically described and it is to be understood that the invention includes all such variations, modifications and/or additions which fall within the scope of the following claims.

What is claimed is:

1. A process of cutting a material using a plasma torch, including
   (i) supplying a plasma forming gas and an electrical current to the plasma torch for generating a plasma arc jet,
   (ii) moving the plasma torch relative to the material for the plasma arc jet to cut the material,
   (iii) pulsing the current supplied to the torch to control the amount of electrical energy of the arc per unit length of cut, and
   (iv) varying the pulsing of the current to maintain the momentum of the plasma arc jet substantially constant, notwithstanding variations in the electrical energy of the arc.

2. A process as claimed in claim 1 wherein the pulsing to control the amount of electrical energy of the arc is controllably varied in dependence on a cutting process variable.

3. A process as claimed in claim 2 wherein the cutting process variable is one of: the angle of a stream of molten material ejected from the cut, the size of droplets of molten material ejected from the material, the intensity or spectral pattern of light emitted from the plasma arc jet and material interface, the arc voltage, and the cutting speed.

4. A process as claimed in claim 3 wherein the pulses are varied depending on the cutting speed.

5. A process as claimed in any one of claims 1 to 4 wherein the pulsing of the current is varied by varying the pulsing frequency.

6. A process as claimed in claim 5 wherein the pulsing frequency is controller such that the period of the arc current pulsing is of the order of the time constant of the pressure response of a nozzle of the torch through which the plasma forming gas flows to a step arc current change.

7. A process as claimed in claim 6 wherein the pulsing frequency is varied between about 150 Hz to 600 Hz.

8. A process as claimed in any one of claims 1 to 7 wherein the pulses are varied by additionally varying any one or more of: the pulse duty, upper current value and depth of pulsing.

9. A process as claimed in claim 8 wherein the pulse duty is varied.

10. Plasma arc cutting apparatus including:
    a plasma torch for providing a plasma arc jet for cutting a material,
    a power supply for supplying a current to the torch for generating the plasma arc jet,
    means for pulsing the current to the torch, wherein the pulsing means is operable to variably pulse the arc current such that the momentum of the plasma arc jet is maintained substantially constant whilst the electrical energy of the arc is varied.

11. Apparatus as claimed in claim 10 including means for measuring a cutting process variable to supply a signal to the pulsing means to variably pulse the arc current in dependence on the cutting process variable.

12. Apparatus as claimed in claim 11 wherein the means for measuring a cutting process variable measures the cutting speed.

13. Apparatus as claimed in claim 11 wherein the means for measuring a cutting process variable measures the angle of a stream of molten material ejected from a material being cut.

14. Apparatus as claimed in claim 11 wherein the means for measuring a cutting process variable measures the size of droplets of molten material ejected from a material being cut.

15. Apparatus as claimed in claim 11 wherein the means for measuring a cutting process variable measures the intensity or spectral pattern of the light emitted from the plasma arc jet and material interface.

16. Apparatus as claimed in any one of claims 10 to 15 wherein the means for pulsing the current to the torch is operable to vary the pulsing frequency.

17. Apparatus as claimed in claim 16 wherein the means for pulsing is operable to additionally vary any one or more of the pulse duty, upper current value and depth of pulsing.

* * * * *